United States Patent
Shoda

(10) Patent No.: US 8,035,870 B2
(45) Date of Patent: *Oct. 11, 2011

(54) IMAGE PROCESSING APPARATUS AND IMAGE PROCESSING METHOD

(75) Inventor: Hirokazu Shoda, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 212 days.

This patent is subject to a terminal disclaimer.

(21) Appl. No.: 12/325,555

(22) Filed: Dec. 1, 2008

(65) Prior Publication Data
US 2009/0080008 A1 Mar. 26, 2009

Related U.S. Application Data

(63) Continuation of application No. 10/846,631, filed on May 17, 2004, now Pat. No. 7,463,393.

(60) Provisional application No. 60/471,333, filed on May 19, 2003.

(51) Int. Cl.
*G03F 3/00* (2006.01)
*G03F 3/08* (2006.01)
*H04N 1/54* (2006.01)
*H04N 1/56* (2006.01)
*H04N 1/60* (2006.01)
*G06K 9/46* (2006.01)

(52) U.S. Cl. .......... 358/518; 358/1.9; 358/2.1; 358/500; 358/501; 358/505; 358/514; 358/515; 358/520; 382/162; 382/163; 382/164; 382/165; 382/167

(58) Field of Classification Search ............... 358/1.9, 358/2.1, 500, 501, 505, 514, 515, 518, 520; 382/162–165, 167
See application file for complete search history.

(56) References Cited

U.S. PATENT DOCUMENTS

| | | | | |
|---|---|---|---|---|
| 4,476,486 | A | * 10/1984 | Ayata et al. | 358/501 |
| 4,661,703 | A | 4/1987 | Ishikawa et al. | |
| 4,833,505 | A | * 5/1989 | Furuya et al. | 399/231 |
| 5,119,184 | A | 6/1992 | Hiratsuka et al. | |
| 5,168,373 | A | * 12/1992 | Nakamura | 358/406 |
| 5,220,416 | A | * 6/1993 | Hasebe et al. | 358/517 |
| 5,680,230 | A | * 10/1997 | Kaburagi et al. | 358/520 |
| 5,719,689 | A | 2/1998 | Terada | |
| 5,740,333 | A | 4/1998 | Yoh et al. | |

(Continued)

FOREIGN PATENT DOCUMENTS

JP 8-084268 A 3/1996

(Continued)

OTHER PUBLICATIONS

U.S. Appl. No. 10/694,981, filed Oct. 29, 2003, Shoda et al.

*Primary Examiner* — Chan S Park
*Assistant Examiner* — Beniyam Menberu
(74) *Attorney, Agent, or Firm* — Foley & Lardner LLP

(57) ABSTRACT

An image processing apparatus reads an original by R, G and B sensors and a monochromatic sensor, and includes Log conversion means for subjecting signals produced by the reading to Log conversion. When two-color printing is performed, Log conversion parameters are individually set for one of signals produced by the reading of the R, G and B sensors and for a signal produced by the reading of the monochromatic sensor.

9 Claims, 3 Drawing Sheets

U.S. PATENT DOCUMENTS

| | | | |
|---|---|---|---|
| 5,815,291 A | 9/1998 | Shono et al. | |
| 5,973,802 A | 10/1999 | Hirota et al. | |
| 6,081,302 A * | 6/2000 | Hanai | 348/630 |
| 6,111,607 A * | 8/2000 | Kameyama | 348/256 |
| 6,429,953 B1 * | 8/2002 | Feng | 358/520 |
| 6,462,834 B1 * | 10/2002 | Yamamoto et al. | 358/1.9 |
| 6,466,331 B1 | 10/2002 | Tai et al. | |
| 7,190,486 B2 | 3/2007 | Tabata et al. | |
| 7,336,393 B2 * | 2/2008 | Tsutsumi | 358/1.9 |
| 7,463,393 B2 * | 12/2008 | Shoda | 358/518 |
| 2003/0049040 A1 | 3/2003 | Tezuka et al. | |
| 2003/0142376 A1 * | 7/2003 | Tabata et al. | 358/518 |
| 2003/0210411 A1 | 11/2003 | Sawada | |
| 2004/0125408 A1 | 7/2004 | Nozaki | |

FOREIGN PATENT DOCUMENTS

JP   2000-003084   *   1/2000

* cited by examiner

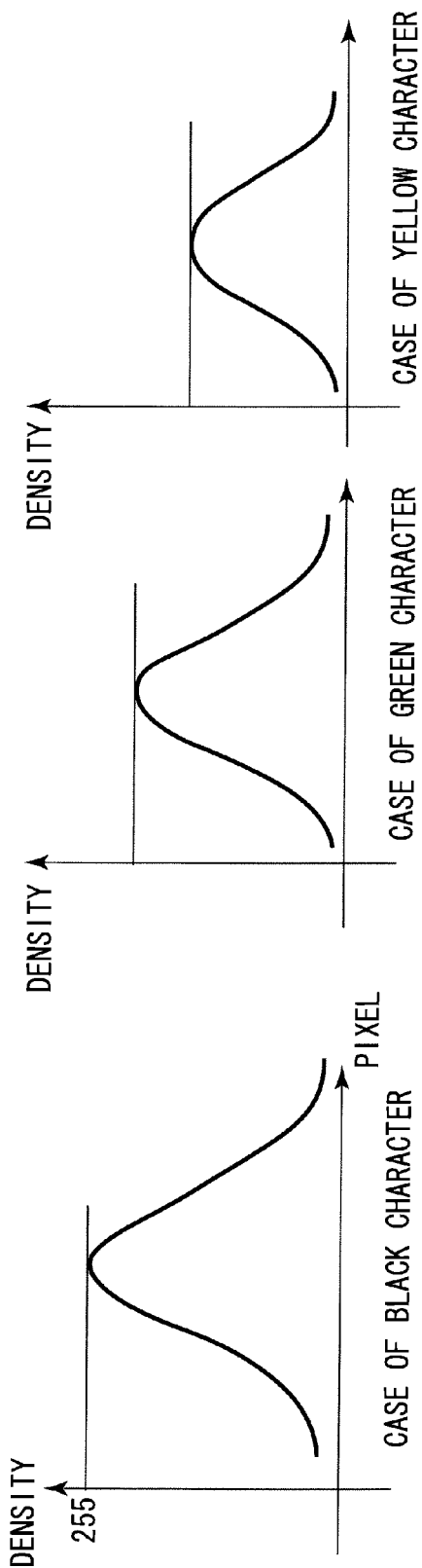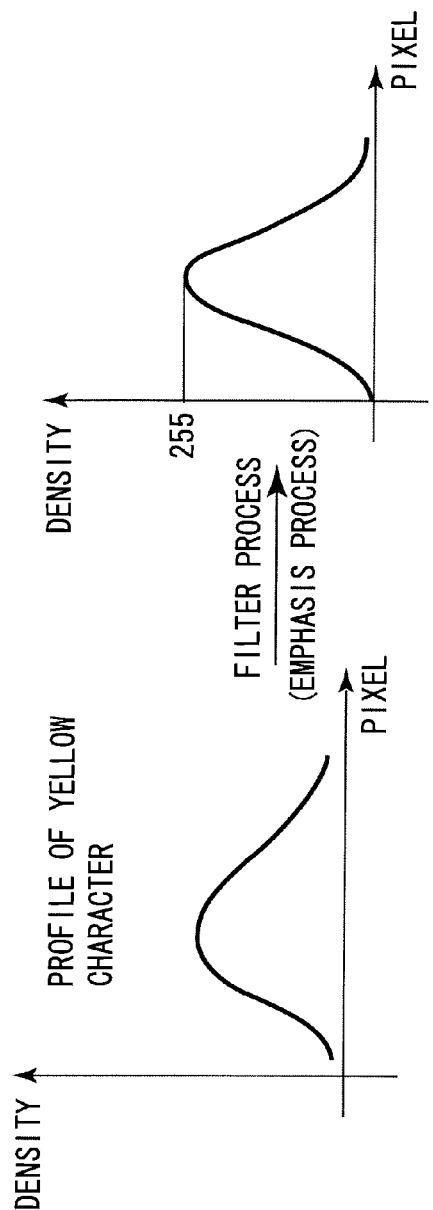

IMAGE PROCESSING APPARATUS AND IMAGE PROCESSING METHOD

CROSS-REFERENCE TO RELATED APPLICATIONS

The present application is a continuation of U.S. application Ser. No. 10/846,631, filed May 17, 2004, which in turn claims benefit of priority to U.S. Provisional Application Ser. No. 60/471,333, filed May 19, 2003, the entire contents of which are incorporated herein by reference.

BACKGROUND OF THE INVENTION

1. Field of the Invention

The present invention relates to an image processing apparatus and an image processing method for performing printing in two designated colors, for example, in a digital copying machine having a CCD that reads red, green and blue signals and a monochromatic signal.

2. Description of the Related Art

In the field of digital copying machines, an image processing apparatus has been proposed, which effects printing of a read original image using two colors (e.g. red and black) designated by a user through designation means such as a control panel. In this case, the main purpose of the two-color printing is to extract a red region on an original, print the extracted red region in red, and print the other color region in black. The two-color printing thus requires means for separating a red region and a black region.

As a technique for the image processing apparatus for two-color printing, a method has been proposed, wherein input R, G, and B signals are directly converted to a red signal and a black signal, which are output color signals, by a matrix arithmetic operation. In the case where signal values (colors) of C (cyan), M (magenta), Y (yellow) and K (black) corresponding to the red and black are directly calculated from the R (red), G (green) and B (blue) signals by the matrix arithmetic operation, C and K colors, which are unnecessary colors, mix in the calculated red signal, resulting in an impure red color. Similarly, unnecessary C, M, and Y colors mix in the calculated black signal, resulting in an impure black color.

Such impure colors occur due to the difficulty in reproducing single colors of red and black by CMYK signals, relative to 256-gradient data of each of RGB signals, and in finding matrix coefficients that do not cause tone inversion.

Jpn. Pat. Appln. KOKAI Publication No. 8-84268 discloses a method for solving the problem.
This method includes a process of subjecting RGB data input by a scanner to a density conversion to produce a monochromatic signal (density signal). The method also includes a process of color-converting RGB data to CMY data, following which a hue determination process and a saturation determination process are performed. Based on the determination results of hue and saturation, it is determined whether red-color printing or black-color printing is to be performed in units of a pixel. The printing with the determined print color is effected using the density data obtained by the density conversion.

This method, however, requires a circuit for determining hue and saturation, leading to an increase in cost. Moreover, since the signals are separated into red and black and are directly used for printing, it is not possible to switch a process for a character region in an image and a process for a photo region in the image.

BRIEF SUMMARY OF THE INVENTION

An object of the present invention is to provide an image processing apparatus and an image processing method, which can obtain two-color image outputs by extracting specific colors from one of RGB signals and a monochromatic signal.

Another object of the invention is to read an original with one of R, G and B signals and a monochromatic signal in the case of two-color printing.

A further object of the invention is to separate an extracted color and some other color on the basis of a selected one of R, G and B signals.

Another object of the invention is to perform the same tone reproduction for two-state signals that have been read.

A further object of the invention is to improve character reproduction by determining a character region, on the basis of read two-state signals.

According to an aspect of the present invention, there is provided an image processing apparatus comprising: first reading means for reading an original by a red line sensor, a green line sensor and a blue line sensor; second reading means for reading the original by a monochromatic line sensor; select means for selecting a specific one of color signals produced by the reading of the first reading means, when two-color printing using two colors including black is designated; first conversion means for performing conversion to enhance color extraction precision of the color signal selected by the select means; and second conversion means for performing conversion to give priority to tone characteristics for a monochromatic signal produced by the reading of the second reading means.

According to another aspect of the present invention, there is provided an image processing method comprising: reading an original by a red line sensor, a green line sensor, a blue line sensor and a monochromatic line sensor; selecting a specific one of color signals produced by the reading of any one of the red line sensor, green line sensor and blue line sensor, when two-color printing using two colors including black is designated; performing conversion to enhance color extraction precision of the selected color signal; and performing conversion to give priority to tone characteristics for a monochromatic signal produced by the reading of the monochromatic sensor.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 illustrates character density reproduction in the case of a black character;

FIG. 6 illustrates character density reproduction in the case of a green character;

FIG. 7 illustrates character density reproduction in the case of a yellow character;

FIG. 8 shows a profile of a yellow character; and

FIG. 9 illustrates density reproduction after a filtering process for a yellow character.

DETAILED DESCRIPTION OF THE INVENTION

An embodiment of the present invention will now be described with reference to the accompanying drawings.

Figure 1:
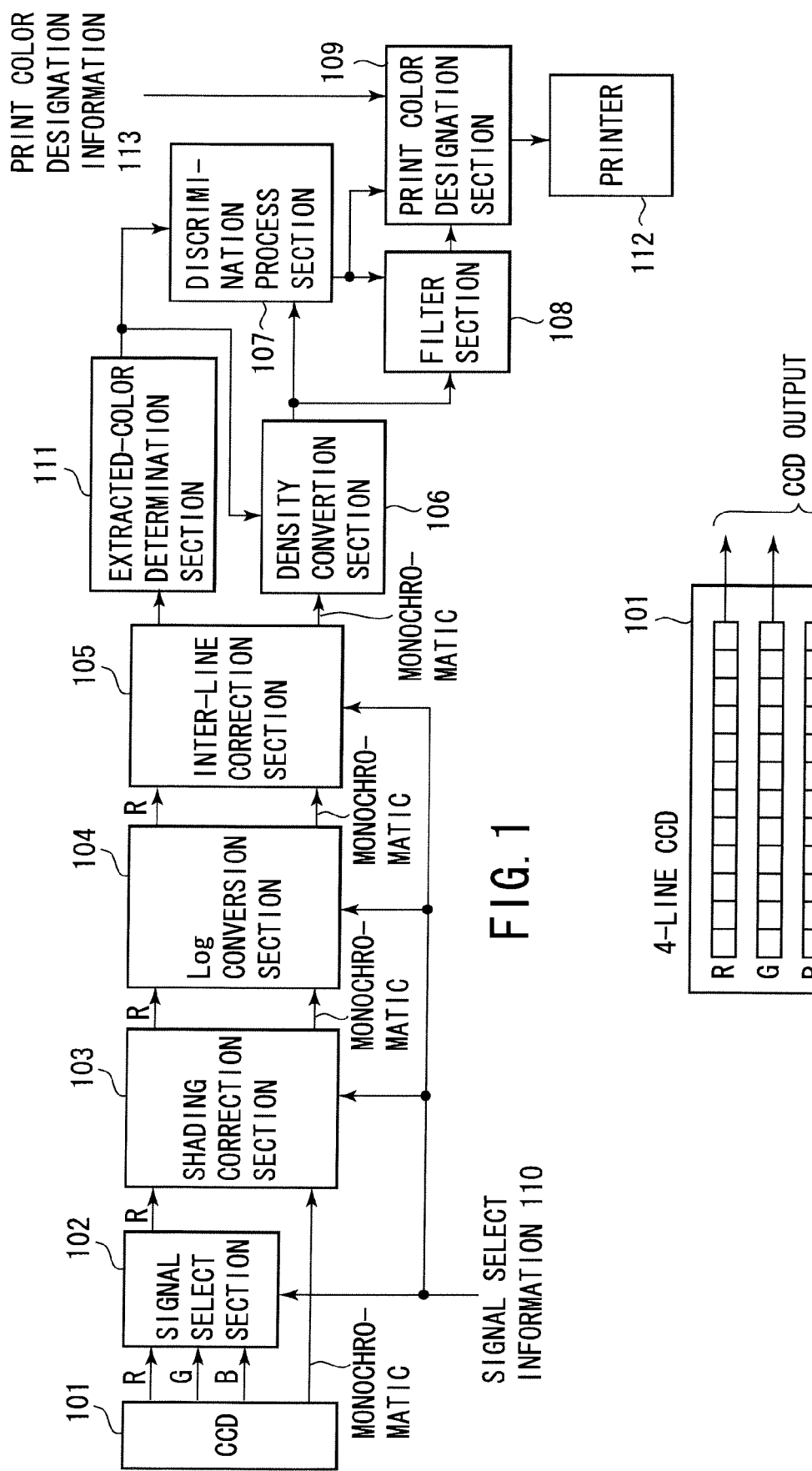
FIG. 1 is a block diagram schematically showing the structure of an image processing apparatus according to the present invention.

FIG. 1 is a block diagram illustrating a process in an image processing apparatus according to the present invention. The image processing apparatus comprises a CCD 101, a signal select section 102, a shading correction section 103, a Log conversion section 104, an inter-line correction section 105, a density conversion section 106, a discrimination process section 107, a filter section 108, a print color designation section 109, an extracted-color determination section 111, and a printer 112.

The CCD 101 receives reflective light from an original (not shown) and photoelectrically converts it. The photoelectrically converted signal from the CCD 101 is A/D converted to digital signals by an A/D conversion section (not shown), i.e. R, G and B signals and a monochromatic signal.

Figure 2:
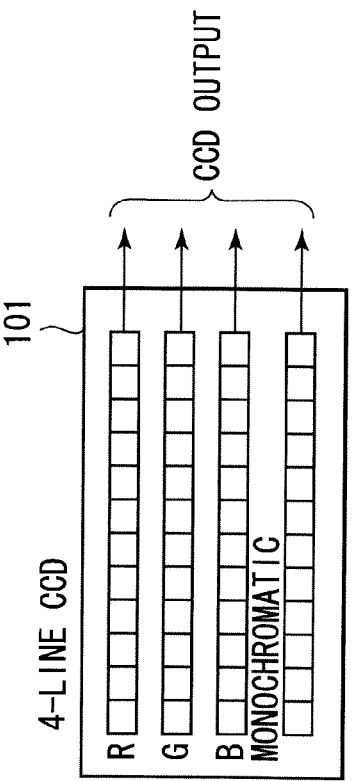
FIG. 2 shows a structure of a 4-line CCD.

FIG. 2 schematically shows the structure of the CCD 101. The CCD 101 is a four-line CCD comprising R, G and B line sensors and a monochromatic line sensor.

The signal select section 102 selects one of the RGB signals output from the CCD 101 and produces the selected signal. That is, one of the R signal, G signal and B signal is selected by user designation means (not shown) such as a control panel. Signal select information 110, which is designated by the user designation means, is input to the signal select section 102. The signal select information 110 is also input to the shading correction section 103, Log conversion section 104 and inter-line correction section 105.

The shading correction section 103 corrects the selected signal and the monochromatic signal with respect to errors due to a variance in sensitivity of the CCD 101, luminous intensity distribution characteristics of an original illuminating lamp (not shown), etc.

The Log conversion section 104 performs a Log conversion process for the selected signal and the monochromatic signal.

The inter-line correction section 105 corrects a color misregistration of the selected signal and monochromatic signal.

The extracted-color determination section 111 determines whether the input signal is associated with the extracted color or some other color.

The density conversion section 106 performs a density conversion process for the monochromatic signal output from the inter-line correction line 105.

The discrimination process section 107 determines whether the input signal is associated with a character region or a photo region in an image (image data).

The filter section 108 performs a filter process (including a low-pass filter process and a high-pass filter process) for the input density signal.

The print color designation section 109 designates two print colors designated by print color designation information 113 (designated through the control panel (not shown)).

The printer 112 effects printing, based on the signals with the designated two print colors.

The process performed in the above-described structure will now be described, assuming that an R signal is designated by the signal select information 110, and red and black are designated by the print color designation information 113.

When the R signal is designated by the signal select information 110, the signal select section 102 selects the R signal from among the R, G and B signals input from the CCD 101, and delivers the selected R signal to the shading correction section 103.

Then, the shading correction section 103 performs shading correction for the R signal and monochromatic signal, and outputs the shading-corrected signals to the Log conversion section 104.

Since the R signal is designated by the signal select information 110, the Log conversion section 104 selects a Log conversion table for the R signal and a Log conversion table for the monochromatic signal. The Log conversion table is a table for producing an 8-bit output signal, relative to a 10-bit input signal.

Figure 3:
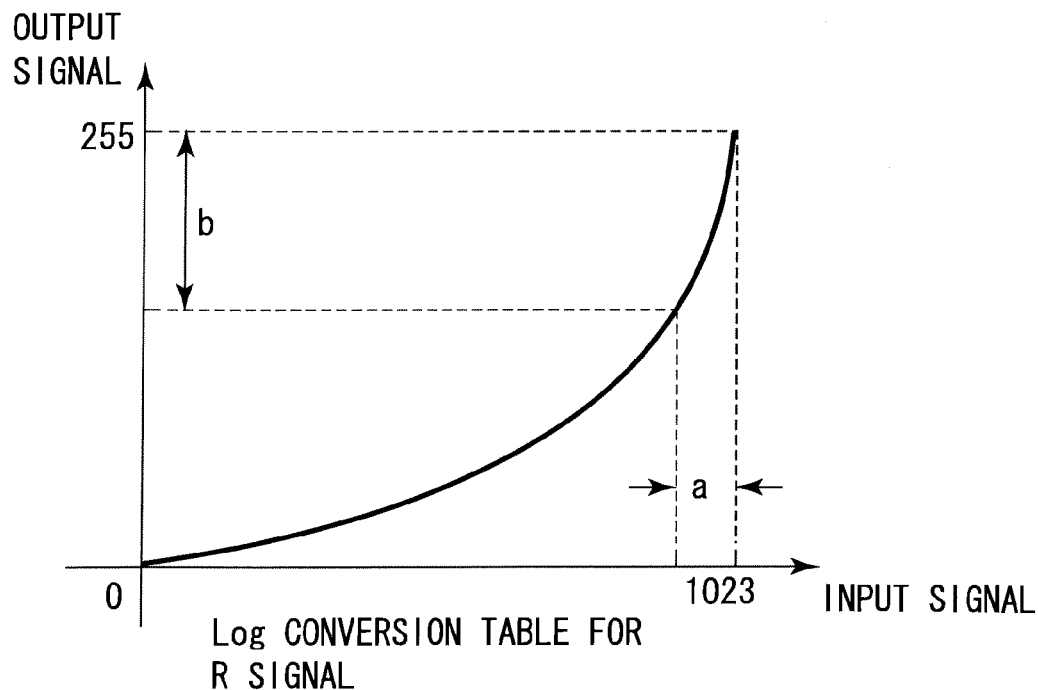
FIG. 3 shows a Log conversion for an R signal.

FIG. 3 shows an example of the Log conversion table for the R signal. The R signal is used to extract a red region (i.e. a region with a high reflectance of the R signal) on the original. By increasing the signal range with high reflectance, the red region is precisely separated from other color regions.

Figure 4:
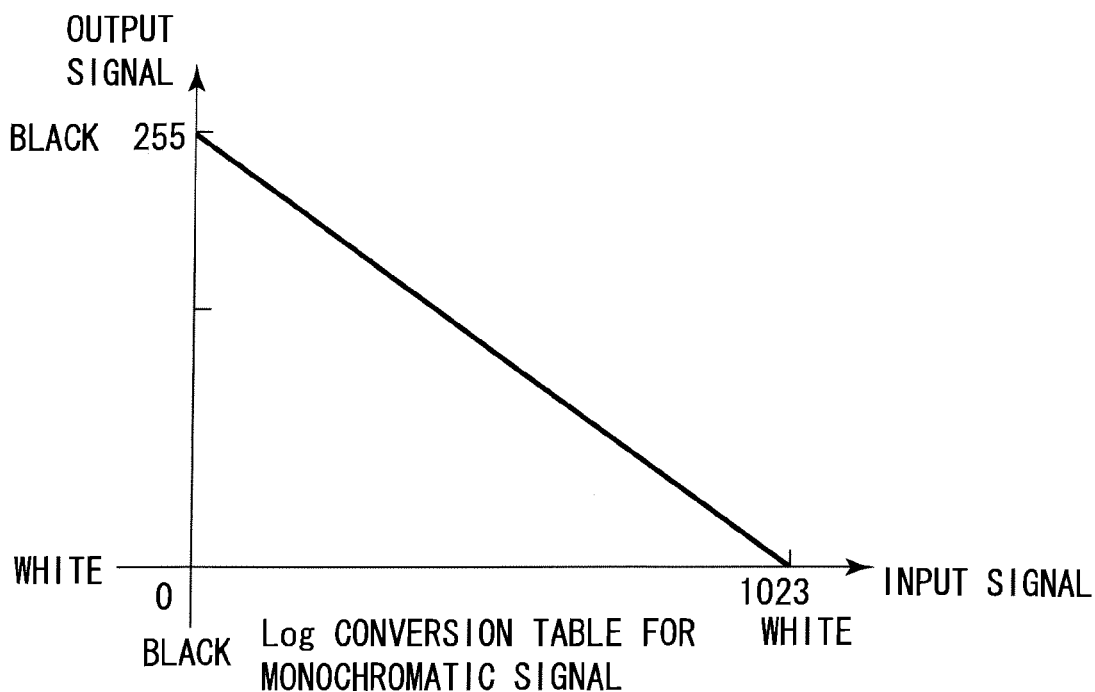
FIG. 4 shows a Log conversion for a monochromatic signal.

FIG. 4, on the other hand, shows an example of the Log conversion table for the monochromatic signal. Since the monochromatic signal is converted to a density signal, a Log conversion suitable for the density signal conversion is performed (with priority to tone characteristics).

The Log conversion section 104 Log-converts the R signal using the Log conversion table for the R signal, and Log-converts the monochromatic signal using the Log conversion table for the monochromatic signal. The Log conversion section 104 outputs the Log-converted signals to the inter-line correction section 105.

The inter-line correction section 105 subjects the Log-converted R signal and monochromatic signal to color misregistration correction, and outputs the R signal to the extracted-color determination section 111 and the monochromatic signal to the density conversion section 106.

The extracted-color determination section 111 determines whether the input R signal is of the extracted color, i.e. red, or some other color. The determination as to whether the input R signal is of the extracted color or some other color is effected in the following manner. The R signal is compared with a designated threshold, and if the signal value is higher than the threshold, "red" is determined. Otherwise, some other color is determined.

The determination method is expressed using formulae:

If R signal value≧threshold, red is determined.

If R signal value<threshold, some other color is determined.

The threshold is a parameter, which is determined in accordance with the sensitivity of the CCD 101 and the luminous intensity distribution characteristics of the original illuminating lamp (not shown).

A determination result of the extracted-color determination section 111 is input to the density conversion section 106 and the discrimination process section 107. In these sections, a process for the extracted color and a process for some other color are switched.

Based on the determination result of the extracted-color determination section 111, the density conversion section 106 performs a density conversion for the monochromatic signal using the following conversion formula:

density=input monochromatic signal/Max value×255.

The Max value in this formula may take one of two values, i.e. a value for an extracted color and a value for some other color.

The reason why the Max value takes one of the two values for the extracted color and some other color is that the monochromatic sensor (CCD 101), which has read red and black on an original, produces different output values. By performing the density conversion using the different Max values for the extracted color and some other color, it becomes possible to individually normalize the extracted color and the other color. Thereby, the solid-region densities of both the extracted color and the other color can be reproduced, and an image can be output without lowering the density of a character image.

The density conversion section 106 outputs the density-converted monochromatic signal (density signal) to the discrimination process section 107 and filter section 108.

Based on the determination result of the extracted-color determination section 111, the discrimination process section 107 determines whether the density-converted density signal is associated with a character image or a photo image. The discrimination result is output to the filter section 108 and print color designation section 109.

The discrimination process is implemented by detecting an edge in an image and detecting a density variation in a rectangular region. A character image appears in black or red on a white background, and so a sudden change occurs in density. By detecting the edge, a contour of a character can be extracted. These determination steps are combined to determine a character and a photo, and a determination result is produced. In this case, the result of the discrimination process is combined with the extracted-color determination result, and the combined output is produced. Thereby, four-state determination results are produced: a character of the extracted color, a photo of the extracted color, a character of some other color, and a photo of said some other color.

As has been described above, in the discrimination process for discrimination between the character and photo, the parameter for discrimination needs to be changed between the extracted color and some other color. The reason is that the density signal, which is input as some other color, may be one of the colors other than the extracted color, such as black, green and yellow.

If the solid black, solid green and solid yellow on the original are compared in terms of density values converted by the above-described density conversion formulae, the following relationship is established: 255=solid black>solid green>solid yellow.

FIGS. 5, 6 and 7 show the magnitudes of the density values of the solid black, solid green and solid yellow.

This relationship is established because the value read by the monochromatic sensor of the CCD 101 is different among the solid black, solid green and solid yellow. In this way, differences in density occur among colors.

In order to successfully carry out the character determination in the discrimination process even if the density varies from color to color, the discrimination parameter used for a color other than the extracted color is made different from the parameter for the extracted color. Specifically, the parameter used for determining the density variation of the color other than the extracted color is set at a low value so that a character can be determined even with a low density variation. By changing the discrimination parameter in this manner, the character/photo determination can be performed with high precision.

On the basis of the discrimination result of the discrimination process section 107, the filter section 108 performs an emphasis process for a character image, and a smoothing process for a photo image. In this case, since the determination result of the extracted-color determination section 111 is added to the character/photo discrimination result, one of the four-state parameters is selected for the filter process parameter.

As mentioned above, since the colors other than the extracted color include black, green, etc., the density varies accordingly. Such a density variation is emphasized by the filter process, and the parameter adjustment is so performed as to output a solid-region density. Thus, a high-quality character image can be obtained.

FIGS. 8 and 9 illustrate an example of the filter process. A profile of a yellow character shown in FIG. 8 is subjected to a filter process (emphasis process), and it is emphasized up to a maximum density value of 255, as shown in FIG. 9.

The filtered density data is output to the print color designation section 109.

Based on the discrimination result of the discrimination process section 107 and the print color designation information 113, the print color designation section 109 determines the print color for the filtered density data.

In the present embodiment, the extracted color is reproduced in red and the other color is reproduced in black. Thus, the density data of the extracted color is assigned to the print colors, C, M, Y and K in the following manner:

red: $C=K=0$, $M=Y=$density data.

The density data of the other color is assigned to the print colors, C, M, Y and K in the following manner:

black: $C=M=Y=0$, $K=$density data.

The density data is assigned to the C, M, Y and K signals, as mentioned above, and the printer 112 effects two-color printing.

In the above-described embodiment, the designated print colors are "red" and "black". Alternatively, other combinations of colors are possible. The color designation is the process for replacing the density data with the print colors of C, M, Y and K. Therefore, printing of cyan, for instance, is possible if C=density data and $M=Y=K=0$.

In the above example of "red", if the amount of the M signal is not set to be equal to that of the Y signal and, instead, the following conversion formula is adopted, a color such as orange can be reproduced:

$$C=K=0, M=\text{density data}\times\alpha, Y=\text{density data}\times\beta.$$

In this way, various combinations of colors can be realized by multiplying the density data by a coefficient and replacing the resultant with the C, M, Y and K signals.

With the above-described structure, in the image processing apparatus of the present invention, the R, G and B signals and monochromatic signal are read by the CCD, one of the R, G and B signals is selected, and the extracted color is determined based on the selected signal. Therefore, color separation is possible without providing a hue/saturation determination circuit as in the prior art. Accordingly, the hardware cost can be reduced.

Moreover, in the present invention, after the conversion to the density data, the discrimination process and filter process may be added. Thereby, character density reproduction is improved, and a high-quality character image can be obtained.

In the above-described example, the extracted color is assumed to be red, but some other color such as green or blue is possible.

As has been described above, according to the present invention, the RGB signals and monochromatic signal, which are read by the CCD, are individually subjected to Log conversion. Accordingly, the RGB signals can be subjected to Log conversion for improving the precision of the extracted-color determination. The monochromatic signal can be subjected to Log conversion for improving the density reproduction (tone reproduction).

The extracted color and some other color are subjected to different density conversion, relative to the monochromatic signal. Thereby, density reproduction can be improved.

The parameters for the discrimination process are switched between the extracted color and some other color. Thereby, the character can be extracted with high precision.

Furthermore, the filter process is switched between the extracted color and some other color, or between the character and photo, whereby parameters suitable for the respective cases can be set.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
a first sensor configured to convert reflective light from an original to a red signal, a green signal and a blue signal;
a second sensor configured to convert the reflective light from the original to a monochromatic signal;
a selector configured to select a color signal which is one of the red signal, the green signal and the blue signal;
an image signal processor configured to generate two signals from the monochromatic signal and the color signal without using the other two of the red signal, the green signal and the blue signal than the color signal; and
a printer configured to print an image based on the two signals,
wherein the image signal processor includes:
a first converter configured to perform conversion to enhance color extraction precision of the color signal selected by the selector;
a second converter configured to perform conversion to give priority to tone characteristics for the monochromatic signal produced due to the conversion by the second sensor; and
a density converter configured to perform density conversion for the monochromatic signal converted by the second converter, in accordance with a signal level of the color signal converted by the first converter.

2. An image forming apparatus comprising:
a first sensor configured to convert reflective light from an original to a red signal, a green signal and a blue signal;
a second sensor configured to convert the reflective light from the original to a monochromatic signal;
a selector configured to select a color signal which is one of the red signal, the green signal and the blue signal;
an image signal processor configured to generate two signals from the monochromatic signal and the color signal without using the other two of the red signal, the green signal and the blue signal than the color signal; and
a printer configured to print an image based on the two signals,
wherein the image signal processor includes:
a first converter configured to perform conversion to enhance color extraction precision of the color signal selected by the selector;
a second converter configured to perform conversion to give priority to tone characteristics for the monochromatic signal produced due to the conversion by the second sensor;
a density converter configured to perform density conversion for the monochromatic signal converted by the second converter, in accordance with a signal level of the color signal converted by the first converter;
a discriminator configured to perform discrimination between a character and a photo, with respect to a density signal produced by the density conversion of the density converter, in accordance with the signal level of the color signal; and
a filter configured to perform a filtering process for the density signal produced due to the density conversion by the density converter, using a filter parameter corresponding to a discrimination result of the discriminator and the signal level of the color signal.

3. An image forming apparatus comprising:
a first sensor configured to convert reflective light from an original to a red signal, a green signal and a blue signal;
a second sensor configured to convert the reflective light from the original to a monochromatic signal;
a selector configured to select a color signal which is one of the red signal, the green signal and the blue signal;
an image signal processor configured to generate two signals from the monochromatic signal and the color signal without using the other two of the red signal, the green signal and the blue signal than the color signal; and
a printer configured to print an image based on the two signals,
wherein the image signal processor includes:
a first converter configured to perform conversion to enhance color extraction precision of the color signal selected by the selector;
a second converter configured to perform conversion to give priority to tone characteristics for the monochromatic signal produced due to the conversion by the second sensor;
a density converter configured to perform density conversion for the monochromatic signal converted by the second converter, in accordance with a signal level of the color signal converted by the first converter;
a discriminator configured to perform discrimination between a character and a photo, with respect to a density signal produced by the density conversion of the density converter, in accordance with the signal level of the color signal;
a filter configured to perform a filtering process for the density signal produced due to the density conversion by the density converter, using a filter parameter corresponding to a discrimination result of the discriminator and the signal level of the color signal; and
a print color designator configured to designate print colors to the density signal filtered by the filter, on the basis of the discrimination result and pre-designated print color designation information on two colors.

4. An image forming method comprising:
converting reflective light from an original to a red signal, a green signal and a blue signal;
converting the reflective light from the original to a monochromatic signal;
selecting a color signal which is one of the red signal, the green signal and the blue signal;

generating two signals from the monochromatic signal and the color signal without using the other two of the red signal, the green signal and the blue signal than the color signal; and printing an image based on the two signals, wherein the generating the two signals includes:
performing first conversion to enhance color extraction precision of the selected color signal;
performing second conversion to give priority to tone characteristics for the monochromatic signal produced; and
performing density conversion for the monochromatic signal converted in the second conversion, in accordance with a signal level of the color signal converted in the first conversion.

5. An image forming method comprising
converting reflective light from an original to a red signal, a green signal and a blue signal;
converting the reflective light from the original to a monochromatic signal;
selectin g a color si al which is one of the red signal, the green signal and the blue signal;
generating two signals from the monochromatic signal and the color signal without using the other two of the red signal, the green signal and the blue signal than the color signal; and
printing an image based on the two signals,
wherein the generating the two signals includes:
performing first conversion to enhance color extraction precision of the selected color signal;
performing second conversion to give priority to tone characteristics for the monochromatic signal produced;
performing density conversion for the monochromatic signal converted in the second conversion, in accordance with a signal level of the color signal converted in the first conversion;
performing discrimination between a character and a photo, with respect to a density signal produced by the density conversion of the density converter, in accordance with the signal level of the color signal; and
performing a filtering process for the density signal produced due to the density conversion, using a filter parameter corresponding to a discrimination result and the signal level of the color signal.

6. An image forming method comprising:
converting reflective light from an original to a red signal, a green signal and a blue signal;
converting the reflective light from the original to a monochromatic signal;
selecting a color signal which is one of the red signal, the green signal and the blue signal;
generating two signals from the monochromatic signal and the color signal without using the other two of the red signal, the green signal and the blue signal than the color signal; and
printing an image based on the two signals,
wherein the generating the two signals includes:
performing first conversion to enhance color extraction precision of the selected color signal;
performing second conversion to give priority to tone characteristics for the monochromatic signal produced;
performing density conversion for the monochromatic signal converted in the second conversion, in accordance with a signal level of the color signal converted in the first conversion;
performing discrimination between a character and a photo, with respect to a density signal produced by the density conversion of the density converter, in accordance with the signal level of the color signal;
performing a filtering process for the density signal produced due to the density conversion, using a filter parameter corresponding to a discrimination result and the signal level of the color signal; and
designating print colors to the filtered density signal, on the basis of the discrimination result and pre-designated print color designation information on two colors.

7. An image processor for providing two color signals to a printer, comprising:
a first sensor configured to convert reflective light from an original to a red signal, a green signal and a blue signal;
a second sensor configured to convert the reflective light from the original to a monochromatic signal;
a selector configured to select a color signal which is one of the red signal, the green signal and the blue signal; and
an image signal processor configured to generate two signals from the monochromatic signal and the color signal without using the other two of the red signal, the green signal and the blue signal than the color signal,
wherein the image signal processor includes:
a first converter configured to perform conversion to enhance color extraction precision of the color signal selected by the selector;
a second converter configured to perform conversion to give priority to tone characteristics for the monochromatic signal produced due to the conversion by the second sensor; and
a density converter configured to perform density conversion for the monochromatic signal converted by the second converter, in accordance with a signal level of the color signal converted by the first converter.

8. An image processor for providing two color signals to a printer, comprising:
a first sensor configured to convert reflective light from an original to a red signal, a green signal and a blue signal;
a second sensor configured to convert the reflective light from the original to a monochromatic signal;
a selector configured to select a color signal which is one of the red signal, the green signal and the blue signal; and
an image signal processor configured to generate two signals from the monochromatic signal and the color signal without using the other two of the red signal, the green signal and the blue signal than the color signal,
wherein the image signal processor includes:
a first converter configured to perform conversion to enhance color extraction precision of the color signal selected by the selector;
a second converter configured to perform conversion to give priority to tone characteristics for the monochromatic signal produced due to the conversion by the second sensor;
a density converter configured to perform density conversion for the monochromatic signal converted by the second converter, in accordance with a signal level of the color signal converted by the first converter;
a discriminator configured to perform discrimination between a character and a photo, with respect to a density signal produced by the density conversion of the density converter, in accordance with the signal level of the color signal; and
a filter configured to perform a filtering process for the density signal produced due to the density conversion by the density converter, using a filter parameter corresponding to a discrimination result of the discriminator and the signal level of the color signal.

9. An image processor for providing two color signals to a printer, comprising:
- a first sensor configured to convert reflective light from an original to a red signal, a green signal and a blue signal;
- a second sensor configured to convert the reflective light from the original to a monochromatic signal;
- a selector configured to select a color signal which is one of the red signal, the green signal and the blue signal; and
- an image signal processor configured to generate two signals from the monochromatic signal and the color signal without using the other two of the red signal, the green signal and the blue signal than the color signal,
- wherein the image signal processor includes:
  - a first converter configured to perform conversion to enhance color extraction precision of the color signal selected by the selector;
  - a second converter configured to perform conversion to give priority to tone characteristics for the monochromatic signal produced due to the conversion by the second sensor;
  - a density converter configured to perform density conversion for the monochromatic signal converted by the second converter, in accordance with a signal level of the color signal converted by the first converter;
  - a discriminator configured to perform discrimination between a character and a photo, with respect to a density signal produced by the density conversion of the density converter, in accordance with the signal level of the color signal;
  - a filter configured to perform a filtering process for the density signal produced due to the density conversion by the density converter, using a filter parameter corresponding to a discrimination result of the discriminator and the signal level of the color signal; and
  - a print color designator configured to designate print colors to the density signal filtered by the filter, on the basis of the discrimination result and pre-designated print color designation information on two colors.

* * * * *